United States Patent [19]

Jude et al.

[11] Patent Number: 4,883,369
[45] Date of Patent: Nov. 28, 1989

[54] ROLL MOUNTING DEVICE WITH A COOLED BEARING

[75] Inventors: Daniel Jude, Villeneuve D'Ascq, France; James T. Stull, Evans City, Pa.

[73] Assignee: Dujardin Montbard Somenor, Seclin Cedex, France

[21] Appl. No.: 173,298

[22] Filed: Mar. 25, 1988

[30] Foreign Application Priority Data

Mar. 25, 1987 [FR] France ................. 87 04135

[51] Int. Cl.4 .............. B22D 11/06; F16M 1/00; F16C 37/00; F16C 23/06
[52] U.S. Cl. .................. 384/476; 164/429; 248/659; 248/901; 384/317; 384/321; 384/519; 384/900
[58] Field of Search .............. 384/313–316, 384/317, 321, 256, 467, 476, 493, 519, 557, 605, 905, 900; 164/428, 429, 448; 29/110; 248/659, DIG. 1

[56] References Cited

U.S. PATENT DOCUMENTS

| 1,723,928 | 8/1929 | Fisher | 384/317 |
| 2,539,752 | 1/1951 | O'Malley | 384/315 |
| 2,731,306 | 1/1956 | Keller | 384/321 |
| 4,603,729 | 8/1986 | Kawaguchi | 164/448 X |

Primary Examiner—Thomas R. Hannon
Attorney, Agent, or Firm—Collard, Roe & Galgano

[57] ABSTRACT

A mounting device for a roll, particularly a roll for a continuous casting apparatus, comprises a support and a bearing for the roll affixed to the support, the support and the bearing defining channels for the circulation of a cooling fluid therethrough, the support and bearing channels being in communication with each other across a plane of support of the bearing on the support through respective ends of the channels. To assure a fluid-tight connection between the support and bearing channels without precise positioning of the bearing in an axial direction and to enable the vertical position of the bearing with respect to the support to be adjusted, a tubular element is slidingly mounted in a seat at the end of each channel defined in the support or the bearing, a spring element biases each tubular element outwardly from each end into contact with an opposite surface of the support or bearing, the tubular elements having ends maintained in contact with the opposite surface by the spring elements, and a fluid-tight gasket in the cylindrical surface of each tubular element provides a sliding fluid-tight seal between the tubular element and the seat.

5 Claims, 2 Drawing Sheets

ROLL MOUNTING DEVICE WITH A COOLED BEARING

BACKGROUND OF THE INVENTION

1. Field of the Invention

The present invention relates to a mounting device for a roll, particularly a roll for continuous casting apparatus, which comprises a support means and a bearing means for the roll, the bearing means being affixed to the support means and a wedge element being optionally positioned between the support and bearing means, and the support means and the bearing means defining channels for the circulation of a cooling fluid therethrough, the support means and bearing means channels being in communication with each other across a plane of support of the bearing means on the support means through respective ends of the channels. The channels are connected to inlet and discharge conduits for the cooling fluid, which are affixed to the support means.

2. Description of the Prior Art

Generally, the connections between the conduits and the channels are constituted by flexible or rigid pipes at the exterior of the support means and they are, therefore, quite vulnerable. In continuous casting apparatus, for example, these connecting pipes are subject to destruction by hot liquid metal which may escape from the casting. Furthermore, each time it is desired to replace a roll and its bearings, the connecting pipes must be detached from the bearings and must be reattached to the bearings of the new roll, which takes time and complicates the operation.

To remedy this inconvenience, it has been proposed to provide the bearing means with ferrules attached to the cooling fluid channels and projecting from the end face of the bearing means supporting the same on the support means, these ferrules being received in the open ends of the cooling fluid channels in the support means when the bearing means is placed on the support means, the cooling fluid channels in the support means being connected to the inlet and discharge conduits for the cooling fluid. The ferrules have a frusto-conical end to facilitate their entry into the open channel ends in the support means and are provided with fluid-tight gaskets. This arrangement is not satisfactory, however, when it is necessary to be able to adjust the position of the bearing means with respect to the support means by the interposition of wedges, as is particularly the case in a continuous casting machine where the position of each roll must be so adjusted that the roll assembly defines a regular support surface of a predetermined profile for the casting. Furthermore, the arrangement requires a perfect alignment of the ferrules and the support means channels, which is difficult to obtain in long assemblies.

SUMMARY OF THE INVENTION

It is accordingly a primary object of this invention to overcome these disadvantages and to assure a perfectly fluid-tight connection between the channels in the support and bearing means without requiring a precise axial positioning of the bearing means while enabling the bearing means to be adjusted in height with respect to the support means.

The above and other objects are accomplished according to the invention with a respective tubular element slidingly mounted in a seat at the end of each of said channels defined in either the support or bearing means, each tubular element having a cylindrical surface, a respective spring element biasing each tubular element outwardly from each channel end into contact with an opposite surface of the support or bearing means, the tubular elements having ends maintained in contact with the opposite surface by the spring elements, and a respective fluid-tight gasket in the cylindrical surface of each tubular element providing a sliding fluid-tight seal between the tubular element and the seat.

The above and other objects, advantages and features of the present invention will become more apparent from the following detailed description of a now preferred embodiment thereof, taken in conjunction with the accompanying drawing.

DESCRIPTION OF THE PREFERRED EMBODIMENT

Figure 1:
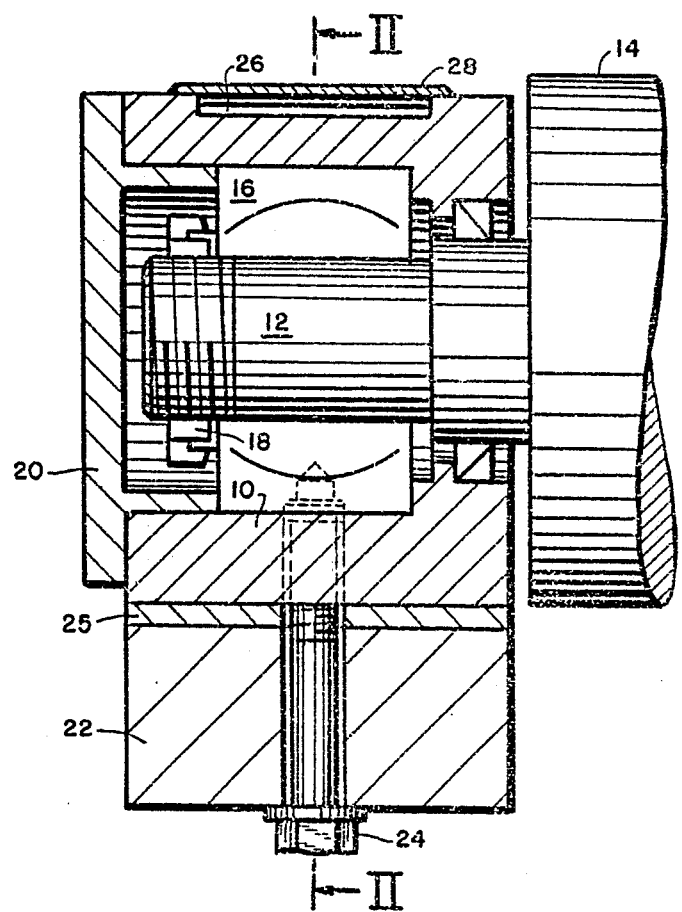
FIG. 1 is a sectional view of the mounting device, taken along line I—I of FIG. 2
Figure 2:
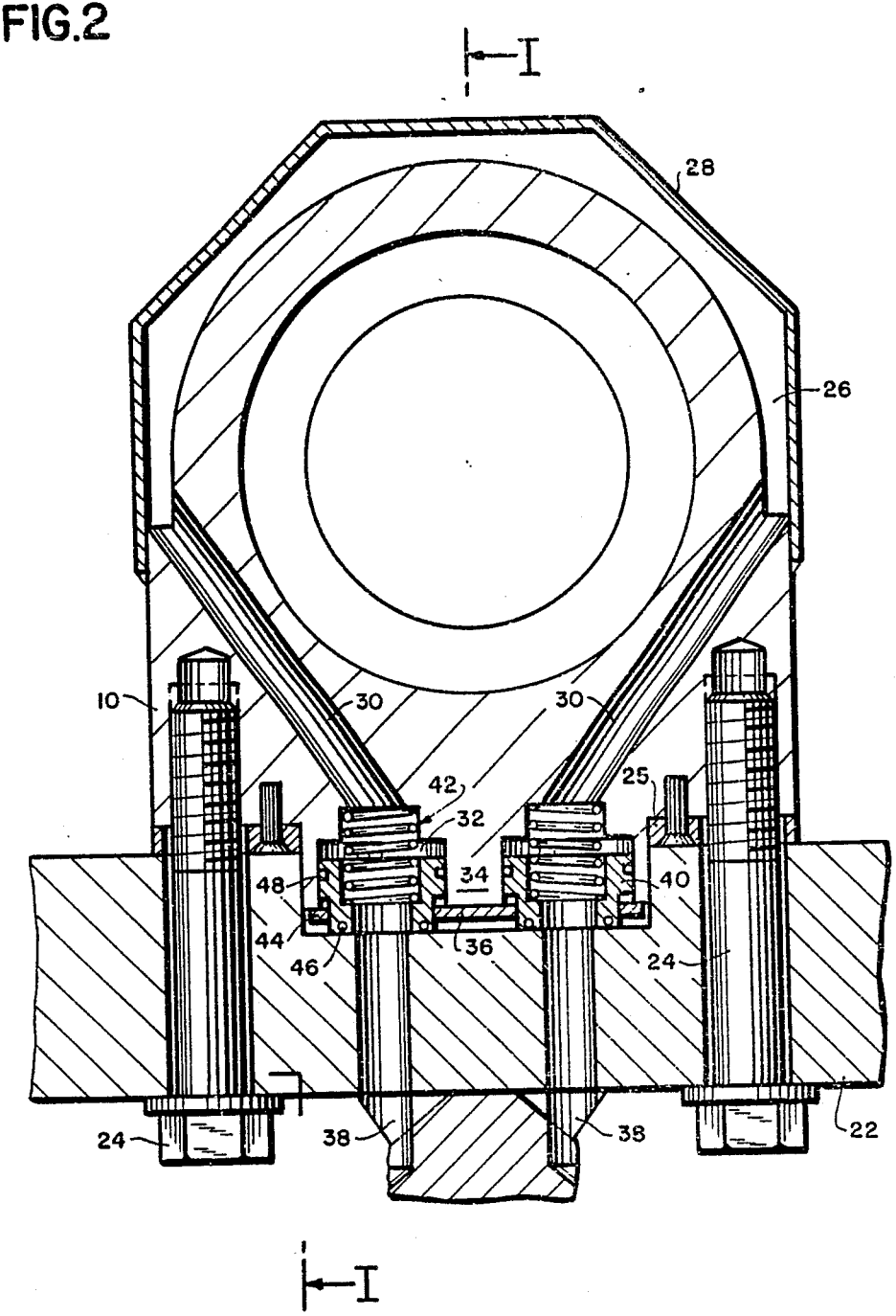
FIG. 2 is a sectional view of the mounting device, taken along line II—II of FIG. 1.

Referring now the the drawing, the mounting device for roll 14 comprises support 22 and bearing 10 for the roll, which is affixed to the support by two bolts 24, with the interposition of wedges 25 which adjust the vertical position of roll 14 with respect to support 22. The illustrated bearing 10 is a roll bearing wherein trunnion 12 of the roll is mounted. Interior roll bearing cage 16 is maintained on the trunnion by screw 18 and the exterior roll bearing cage is maintained in the body of the bearing by cover 20.

A semi-circular chamber 26 is machined into an upper part of the bearing and is closed by hood 28 soldered to the bearing. Support 22 and bearing 10 define channels 30, 38 for the circulation of a cooling fluid therethrough, the channels being in communication with each other across a plane of support of the bearing on the support through respective ends of the channels. In the illustrated embodiment, the opposite ends of semi-circular chamber 26 are connected to ends of channels 30 in the body of bearing 10 opposite to their ends in communication with end of channels 38 in the body of support 22. A lower portion 34 of the bearing is received in recessed portion 36 of the support. A respective tubular element 40 having a cylindrical surface is slidingly mounted in a respective cylindrical seat 32 machined in lower bearing portion 34 at the end of each channel 30. The axes of seats 32 extend perpendicularly to the plane of the bottom of recessed support portion 36 and are aligned with the axes of channels 38 to which the cooling fluid inlet and discharge conduits (not shown) are attached. The minimum inner diameter of tubular elements 40 is at least equal to the diameter of the cooling fluid circulating channels and the diameter of seats 32 is larger.

A respective spring element 42 biases each tubular element 40 outwardly from each end of channels 30 into contact with an opposite surface of support 22, the tubular elements having ends maintained in contact with the opposite surface by the spring elements. A respective fluid-tight gasket 48 in the cylindrical surface of each tubular element provides a sliding fluid-tight seal between the tubular element and the seat. As shown, a respective fluid-tight gasket 46 in the end of tubular element 40 provides a fluid-tight seal between the tubular element and the opposite surface.

In the illustrated embodiment, tubular element 40 comprises a shoulder in the cylindrical surface adjacent the end thereof and a shoulder in the inner surface, the larger diameter portion of the tubular element being slidable in seat 32 while the smaller diameter end portion of the tubular element is pressed against the bottom of recessed portion 36 of support 22 by spring element 42. This spring element is a coil spring compressed between the shoulder in the inner surface of the tubular element and a shoulder machined in bearing 10 at the end of channel 30. A thin plate 44 pierced by holes for the passage of the smaller diameter end portion of the tubular elements is affixed to lower bearing portion 34 and constitutes an abutment cooperating with the shoulder in the cylindrical surface of the tubular element to prevent outwardly biased tubular element 40 from being pushed put of seat 32. The diameter of the holes in plate 44 slightly exceeds that of the end portion of tubular elements 40 to enable the same readily to slide therethrough, and it is smaller than that of cylindrical seats 32 so that plate 44 prevents tubular elements 40 from being displaced out of their seats when the bearing is removed from the support.

Annular fluid-tight gaskets 46 and 48 are seated in circular grooves machined respectively in the end faces of tubular elements 40 in contact with the bottom surface of recessed portion 36 of support 22 and in the large-diameter cylindrical surface of the tubular elements.

This mounting enables a fluid-tight connection of cooling fluid channels 30 and 38 to be effected automatically when bearing 10 is affixed to support 22 and makes it possible to provide such a connection for different thicknesses of wedges 25 without the necessity of maintaining a perfect alignment between seats 32 and channels 38.

If desired, the seats for tubular sealing elements 40 may be machined into support means 22 and may be pressed against bearing means 10 around the ends of channels 30, i.e. the tubular elements are slidingly mounted in a seat at the end of each channel defined in one of these means and are biased outwardly from each end into contact with an opposite surface of the other means.

What is claimed is:

1. A mounting device for a roll, which comprises
   (a) a support means,
   (b) a bearing means for the roll, the bearing means being affixed to the support means,
      (1) the support means and the bearing means defining channels for the circulation of a cooling fluid therethrough, the support means and bearing means channels being in communication with each other across a plane of support of the bearing means on the support means through respective ends of the channels,
   (c) a respective tubular element slidingly mounted in a seat at the end of each of said channels defined in one of said means, each tubular element having a cylindrical surface,
   (d) a respective spring element biasing each tubular element outwardly from each one of said ends into contact with an opposite surface of the other one of said means, the tubular elements having ends maintained in contact with the opposite surface by the spring elements, and
   (e) a respective fluid-tight gasket in the cylindrical surface of each tubular element providing a sliding fluid-tight seal between the tubular element and the seat.

2. The roll mounting device of claim 1, further comprising a wedge element between the support and bearing means.

3. The roll mounting device of claim 1, further comprising a respective fluid-tight gasket in the tubular element end providing a fluid-tight seal between the tubular element end and the opposite surface.

4. The roll mounting device of claim 1, wherein the tubular element comprises a shoulder in the cylindrical surface adjacent the end thereof and said one means comprises an abutment cooperating with the shoulder to prevent the outwardly biased tubular element from being pushed out of the seat.

5. The roll mounting device of claim 1, wherein the spring element is a coil spring, and further comprising a shoulder in the inner surface of the tubular element and a shoulder in the one means, the coil spring being compressed between said shoulders.

* * * * *